United States Patent [19]
Hallenbeck

[11] Patent Number: 5,293,357
[45] Date of Patent: Mar. 8, 1994

[54] METHOD AND APPARATUS FOR CONTROLLING A TELEVISION PROGRAM RECORDING DEVICE

[75] Inventor: Peter D. Hallenbeck, Efland, N.C.

[73] Assignee: The SuperGuide Corporation, Shelby, N.C.

[21] Appl. No.: 580,380

[22] Filed: Sep. 10, 1990

[51] Int. Cl.$^5$ .............................................. H01N 5/76
[52] U.S. Cl. ...................................... 348/734; 358/335
[58] Field of Search .................. 358/194.1, 191.1, 188, 358/903, 335; H04N 5/76

[56] References Cited

U.S. PATENT DOCUMENTS

| | | | |
|---|---|---|---|
| 4,016,361 | 4/1977 | Pandey | 358/83 |
| 4,170,782 | 10/1979 | Miller | 358/84 |
| 4,337,480 | 6/1982 | Bourassin et al. | |
| 4,413,281 | 11/1983 | Thonnart | |
| 4,477,830 | 10/1984 | Lindman et al. | |
| 4,488,179 | 12/1984 | Krüger et al. | 358/181 |
| 4,523,295 | 6/1985 | Zato | 358/335 |
| 4,706,121 | 11/1987 | Young | 358/142 |
| 4,751,578 | 6/1988 | Reiter et al. | 358/183 |
| 4,841,132 | 6/1989 | Kajitani et al. | 358/335 |
| 4,873,584 | 10/1989 | Hashimoto | 358/191.1 |
| 4,908,707 | 3/1990 | Kingborn | 358/191.1 |
| 4,954,899 | 9/1990 | Tanabe et al. | 358/191.1 |
| 4,959,720 | 9/1990 | Duffield et al. | 358/194.1 |
| 4,963,994 | 10/1990 | Levine | 358/335 |
| 4,985,783 | 11/1991 | Falck | 358/335 |
| 4,998,292 | 3/1991 | Eigeldinger et al. | 358/191.1 |
| 5,038,211 | 8/1991 | Hallenbeck | 358/903 |

FOREIGN PATENT DOCUMENTS

| | | | |
|---|---|---|---|
| 0098956 | 1/1984 | European Pat. Off. | 358/194.1 |
| 9007844 | 7/1990 | PCT Int'l Appl. | H04N 5/782 |
| 2034995 | 6/1980 | United Kingdom | |

OTHER PUBLICATIONS

Videotext Programmed Video Recorder, by G. Hofmann et al., Published in Rundfunktechnische Mitteilungen (1982) vol. 6, pp. 254–257 with translations.
Specification and Drawings for U.S. Pat. application Ser. No. 07/375,829 filed Jul. 5, 1989 entitled Method and Apparatus for Transmitting and Receiving Television Program Information, Inventor: Peter D. Hallenbeck.

Primary Examiner—Mark R. Powell
Assistant Examiner—Jeffrey S. Murrell
Attorney, Agent, or Firm—Bell, Seltzer, Park & Gibson

[57] ABSTRACT

A method and apparatus for controlling a VCR or other television program recording device for unattended recording of television programs based upon user selections from an on-line television program schedule system, converts the on-line television schedule listings for the user selected programs into event timer information and loads the event timer information into an event timer. The event timer, which may be located in the VCR or external to the VCR, controls the VCR for unattended recording in the customary manner. Since the VCR is controlled by the event timer information, rather than directly from the on-line program schedule listings, the VCR may be controlled for unattended recording even if the on-line listings are lost. Accordingly, the on-line listings may be stored in low cost volatile memory (dynamic RAM). Only the event timer information should be stored in non-volatile memory (static RAM), which can be kept small due to the limited information contained in the event timer information. A commercially viable system is thereby provided.

8 Claims, 2 Drawing Sheets

METHOD AND APPARATUS FOR CONTROLLING A TELEVISION PROGRAM RECORDING DEVICE

FIELD OF THE INVENTION

This invention relates to television program recording devices such as videocassette recorders, and more particularly to a method and apparatus for controlling a television program recording device from an on-line television program schedule listing.

BACKGROUND OF THE INVENTION

Television program recording devices such as videocassette recorders (VCRs) have become increasingly popular for recording television programs. As is well known, the "record button" on a VCR can be activated at any time to record a television program being received. Typically, VCRs also include an infrared remote control which may be used for remote activation of the record button, or any other button, to facilitate use of the VCR. As is also well known, many present day VCRs are "programmable" so that a user can set a future time and channel for unattended recording. Such programmable VCRs typically may be programmed with up to fourteen or more "events" so that multiple TV programs may be set for unattended recording.

As is well known to those having skill in the VCR art, the data for events to be recorded is typically stored in the VCR in an "event timer". The event timer is typically a nonvolatile memory so that the contents thereof are not erased if power to the VCR is interrupted, although volatile memories may also be used. The event timer typically includes only that information necessary for controlling the VCR. To set a VCR for recording, "time" and "channel" information must be provided for each event. The "time" information may comprise an indication of a start date and start time (often provided in terms of an actual date and time or in the form of a time from beginning of the year), and an indication of a stop time (in the same form as the start time, or in the form of a program duration from the start time) for each of the events which are to be recorded.

In an effort to simplify user selection of desired TV programs to be viewed and/or recorded, "on-line" television program guides have also been developed and marketed. An on-line program guide is typically broadcast over a satellite or cable system, and the received TV program schedule information is stored in a satellite receiver, cable TV decoder or other unit. An on-line system eliminates paper TV guides, which are difficult to distribute and often are inaccurate because of last minute changes.

A particularly effective system for on-line transmission and reception of television program schedule information is described in U.S. Pat. No. 5,038,211 to Hallenbeck entitled Method and Apparatus for Transmitting and Receiving Television Program Information, which is assigned to the assignee of the present invention, the disclosure of which is hereby incorporated herein by reference. In the Hallenbeck patent, a commercially viable on-line television program information system is provided which extracts from a broadcast datastream only that program information which meets predetermined selection criteria store in the system.

Another example of an on-line TV program schedule system is described in U.S. Pat. No. 4,751,578 to Reiter et al. entitled System for Electronically Controllably Viewing on a Television Updateable Television Programming Information. This patent describes a system for viewing on a television, updateable television programming information, and for permitting the viewer to perform searches on information so as to display subsets of the information desired by the viewer. Yet another example of an on-line TV program schedule system is described in U.S. Pat. No. 4,706,121 to Young entitled TV Schedule System and Process. This patent describes a system for allowing user selection of broadcast programs from schedule information. The schedule information for the selected programs is stored in a memory and is used by the data processor to control a programmable TV tuner.

Attempts have also been made to provide a system for controlling a VCR based on user selected programs from an on-line scheduling system. For example, the aforementioned Young '121 patent describes a system in which user selection criteria are used by a data processor to select programs from the schedule information, and the schedule information is then used to control a VCR for unattended recording of the selected programs. In particular, according to this patent, the schedule information for the selected user programs is stored. The system is connected to the remote control facilities of the VCR, so that at the appropriate time it can supply power to the VCR, start recording and stop recording via the remote control. The VCR may be turned on and off at all appropriate times to record all desired programs. Alternatively, the VCR may be left on all the time and recording may be activated and deactivated via the VCR's "pause" line by remote control.

The above described system for controlling unattended recording by a VCR from an on-line program schedule system provides flexibility for recording. For example, the system may be configured so that the VCR is activated only if the TV is not on at the appropriate time. Moreover, since an on-line scheduling system typically includes classifications of programs by type, an entire series of programs may be designated for recording by merely selecting one program in the series. Also, if the on-line schedule changes, the user selection criteria may be applied to the updated schedule data and the VCR may be activated based upon the new schedule times. In other words, VCR activation is tied to a selected show, or series of shows, regardless of when this show is broadcast.

Notwithstanding the advantage of controlling a VCR from an on-line schedule system, prior systems have not been commercially viable because prior systems required that the program schedule information be stored in a nonvolatile memory so that the VCR could be activated even if power was momentarily lost at the on-line television program schedule system. For example, in the system of the aforesaid '121 patent, the stored TV program schedule listings must be periodically searched against the user's selection criteria in order to determine when the VCR is to be activated. If a power interruption takes place and the listings are lost, the VCR will no longer be activated at the appropriate time and the opportunity to record the program will be irretrievably lost. This undesirable feature could be eliminated by storing the TV program schedule listings in nonvolatile memory. Unfortunately, a nonvolatile memory large enough to store a useful quantity of television program scheduling information is prohibitively expensive and would preclude commercial viability.

In conclusion, on-line TV schedule information systems which provide unattended recording have been faced with two alternatives, neither of which is commercially satisfactory. The system could include a large nonvolatile memory (also referred to as "static RAM") for storing the television program scheduling information, making the system prohibitively expensive. Alternatively, the schedule information could be stored in volatile memory (also referred to as "dynamic RAM"), which means that the recording times will be permanently lost if power is momentarily interrupted. Either alternative precludes a commercially viable system.

SUMMARY OF THE INVENTION

It is therefore an object of the invention to provide an improved method and apparatus for controlling a television program recording device.

It is another object of the invention to provide a method and apparatus for controlling a television program recording device based on user selections from an on-line television program schedule system.

It is yet another object of the present invention to provide a method and apparatus for controlling a recording device from an on-line schedule system which does not require the TV program schedule information to be stored in nonvolatile memory in order to retain the recording feature.

It is still another object of the present invention to provide a method and apparatus for controlling a recording device from an on-line schedule system without losing the ability to control the recording device if the on-line schedule listings are lost due to a power interruption.

The present invention stems from the realization that in order to control a VCR for unattended recording based on user selection of programs from an on-line schedule, the proper information must be loaded into an event timer which can then control the VCR according to its well known function. The system of the present invention does not control the VCR directly from the on-line schedule information. Rather, this information is used to load an event timer with event timer information. The event timer then controls the VCR.

Accordingly, the invention includes means for storing the television program schedule listings and for accepting user designations of selected ones of the television program schedule listings for recording. The system then converts the designated ones of the television program listings into event timer information and loads the event timer information into an event timer. The event timer then controls the VCR according to its well known function.

The television program schedule listings may be stored in nonvolatile memory because the VCR is controlled from the event timer. Accordingly, once event timer information is loaded into the event timer, the listings themselves are no longer needed for controlling the VCR. In order to maintain control of the VCR after a power interruption, only the event timer need be made of nonvolatile memory. Since the event timer only requires time and channel information for a limited number of events, this nonvolatile memory can be very small. Unattended recording may thereby be controlled after a power interruption, without requiring a system which is prohibitively expensive.

In one embodiment of the invention, the event timer is located in the VCR itself. A remote control transmitter or a data bus (such as the consumer electronics home bus) may be used to load event timer information into the event timer in the recording device. In another embodiment of the invention, the event timer may be external to the VCR. As in the first embodiment, the event timer is loaded with event timer information derived from the schedule listing information, and the event timer is used to control the VCR by activating the VCR at the appropriate time or by loading the event timer information from the external event timer into the VCR event timer.

The invention may be embodied in a stand alone unit which interfaces to an on-line TV schedule program information system and a VCR. Alternatively, it may be incorporated in a TV receiver such as a standard TV receiver, a satellite TV receiver, or a cable TV receiver which may or may not also include an on-line schedule system. It may also be incorporated into a VCR. Regardless of the particular embodiment of the invention, the invention allows for unattended recording of a VCR using a low cost controller which is immune to power failure, so that a commercially viable system for unattended recording of a VCR may be provided.

DESCRIPTION OF THE PREFERRED EMBODIMENT

The present invention now will be described more fully hereinafter with reference to the accompanying drawings, in which a preferred embodiment of the invention is shown. This invention may, however, be embodied in many different forms and should not be construed as limited to the embodiment set forth herein; rather, this embodiment is provided so that this disclosure will be thorough and complete, and will fully convey the scope of the invention to those skilled in the art. Like numbers refer to like elements throughout.

Figure 1:
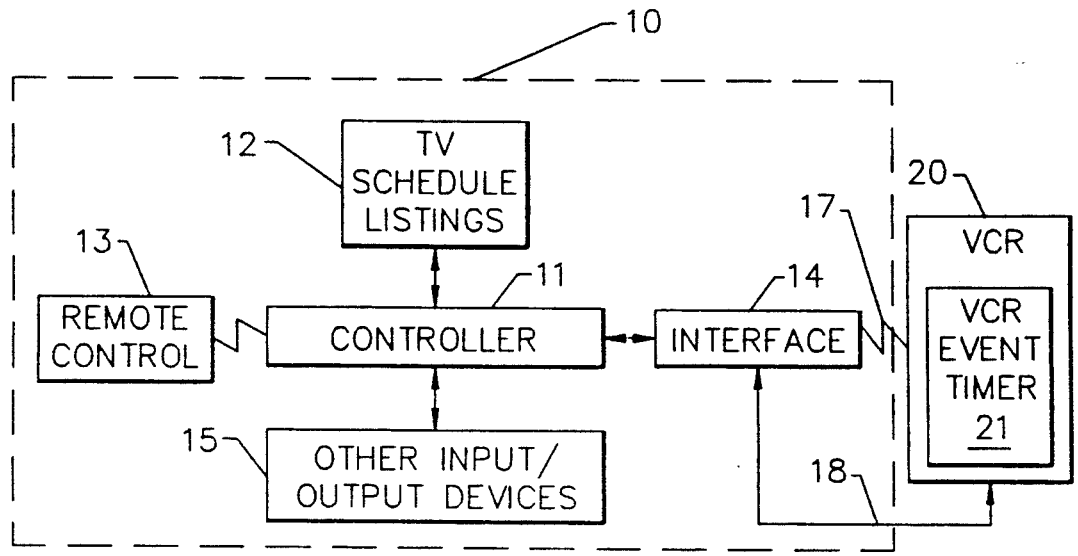
FIG. 1 is a schematic block diagram of a first embodiment of the present invention.

Referring now to FIG. 1, a schematic block diagram of a first embodiment of the present invention will now be described. As shown in FIG. 1, the VCR controlling system 10 includes a memory 12 containing therein on-line TV schedule listings, a remote control or other input device 13 for allowing user selection of TV programs to be recorded, an interface 14 to an event timer 21 in a recording device such as VCR 20, and other input/output devices 15 as necessary. An electronic controller 11, such as a microprocessor or other data processing means, is used for controlling operation of the system. The detailed operation of system 10 will now be described.

The operation of VCR controlling system 10 is controlled by a controller such as a microprocessor 11, for example a Motorola MC68000. Alternatively, a special purpose data processor such as an application specific integrated circuit (ASIC) or other data processing means may be used as a controller 11. It will also be understood by those having skill in the art that system 10 may be a free standing VCR controlling system or may be incorporated into a standard television receiver or a satellite television receiver, cable television receiver (converter box), or into a VCR itself. Accordingly, controller 11 may also control other functions apart from the present invention. In connection with the control of other functions, controller 11 may be interfaced with other input/output devices 15 such as a satellite reception tuner, TV tuner, TV video display or other devices well known to those having skill in the art.

Also connected to controller 11 for operational control thereby is a memory 12 having TV schedule listings stored therein. In order to reduce the cost of the present invention, TV schedule storing means 12 is typically a Volatile random access memory. The design of a TV schedule program memory 12 is well known to those having skill in the art, and is shown for example in the aforesaid U.S. Pat. No. 4,751,578 to Reiter et al. and U.S. Pat. No. 4,706,121 to Young. A preferred design for TV schedule listing memory 12 and a preferred technique for loading TV schedule listings into TV schedule listings memory 12 is described in the aforesaid U.S. Pat. No. 5,038,211 to Hallenbeck, the disclosure of which is hereby incorporated herein by reference. Accordingly, the design of a TV schedule listing memory and the loading of this memory from broadcast TV schedule information will not be described further herein.

System 10 also includes a user selection input means such as a keyboard, or as shown in FIG. 1, a remote control 13. The remote control may be used to input user selection criteria into the system, to initiate a search through the TV schedule listings for those listings which meet the criteria, to view the TV schedule listings which meet the criteria, to select TV programs for recording and to initiate other user functions in a manner well known to those having skill in the art. For example, the operation of a remote control for performing these functions is described in the aforesaid Hallenbeck application and Young patent and need not be described further herein.

According to the present invention, when a program is selected for recording, microcontroller 11 converts the TV schedule listing for that program into event timer information in a manner which will be described in detail below. The event timer information is provided to a VCR interface 14 for loading in a VCR event timer 21. It will be understood by those having skill in the art that many techniques for loading event timer information into event timer 21 may be used. For example, VCR 20 may be programmable via an infrared remote control, and interface unit 14 may include an infrared remote control synthesizer for generating an appropriate control sequence 17 to transfer the event timer information from microcontroller 11 into event timer 21. The design of an infrared synthesizer for transferring sequences of information is well known to those having skill in the art and need not be described further herein. Alternatively, VCRs increasingly include a digital communications bus 18 such as an IEEE Consumer Electronics bus. If the VCR incorporates a bus, then interface unit 14 may include a consumer electronics bus interface or other interface for converting the event timer information into appropriate digital electronic signals.

System 10 operates based on the realization that once TV schedule listings for recording have been designated, they may be converted into event timer information and loaded into an event timer. If the TV schedule listings are lost from TV schedule listing memory 12, because of a power outage or other event, the VCR will still be programmed to record at the appropriate time and the recordings will not be permanently lost. Since the TV schedule listings are not needed after the event timer is loaded, TV schedule listing memory 12 may be a volatile memory. The TV schedule listings may be lost, or may be discarded, without losing the ability to record the designated programs. It will also be understood that if the TV schedule listings are updated, the event timer information is not automatically updated, and as such, may not reflect the updated schedule listings. In other words, the VCR event timer information exists independent of the information in the TV schedule listings.

Figure 2:
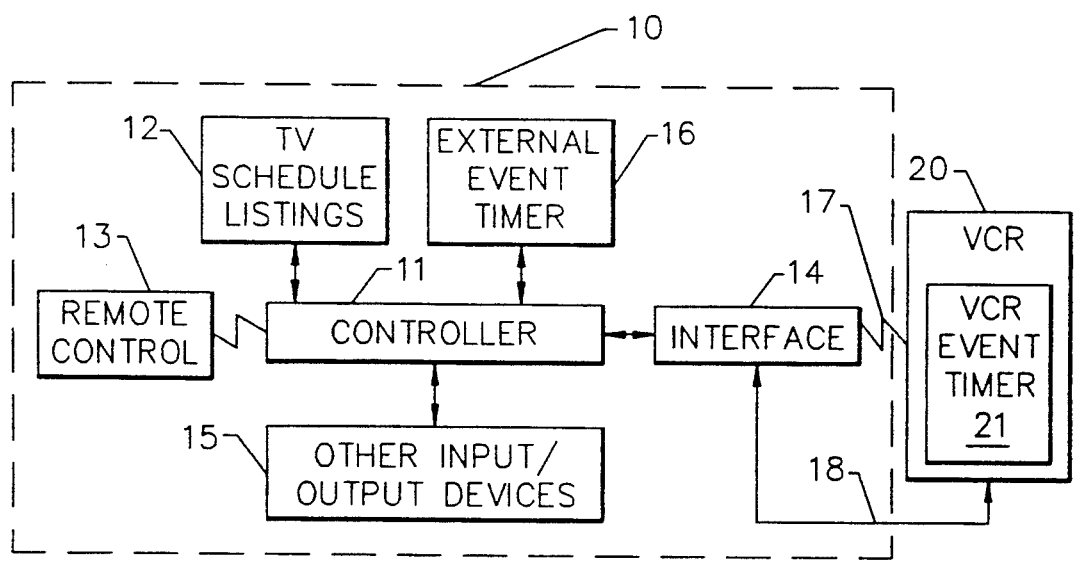
FIG. 2 is a schematic block diagram of a second embodiment of the present invention.

Referring now to FIG. 2, a second embodiment of the present invention will now be described. In this embodiment, an external event timer is provided for controlling the recording of programs by VCR 20. When controller 11 selects from the TV schedule listings in memory 12 according to user designations via input device 13, and converts the TV schedule listing to event timer information, the event timer information is loaded into external event timer 16 in the manner described above. External event timer 16 is preferably a nonvolatile memory so that the event timer information is retained even if power is lost. Then, according to the present invention, the listings in external event timer 16 may be used by controller 11 to send the appropriate signals to VCR 20 at the designated times. Accordingly, the system may be used with a VCR which does not include its own event timer or which includes a volatile event timer. Alternatively, the external event timer 16 may be used to load the VCR event timer 21, which then controls the VCR in the customary manner.

Figure 3:
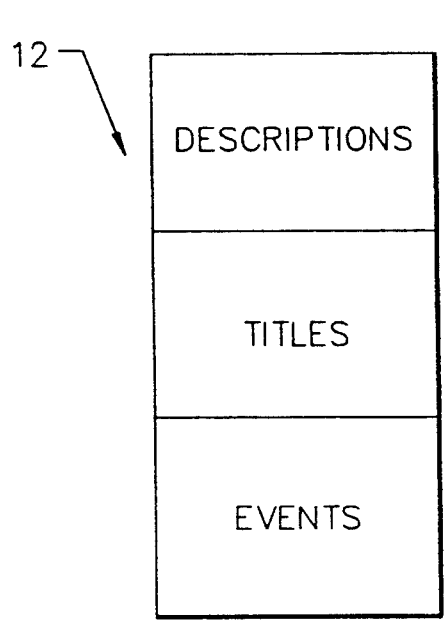
FIG. 3 is a schematic diagram of TV schedule listings which may be stored in the embodiments of FIGS. 1 or 2.

Referring now to FIG. 3, the storing of TV schedule listing information in memory 12 will now be described. A preferred storing scheme, as described in detail in the above identified Hallenbeck patent, is shown. As shown in FIG. 3, the TV schedule listings provide a great deal of descriptive information for TV programs, similar to a paper TV guide. In particular, an "events" group may include fields for a group number, sequence number, day and time, service number identifier, show type and subtype, show number, title length and description length. The details of these fields are provided in the aforesaid Hallenbeck patent and will not be described in detail here. However, it will be understood by those having skill in the art that the fields provided in the events group allow the events to be selected for viewing or recording based upon the desired day, time, service, type of show (e.g. movies, sports, news) subtype of show (e.g. basketball, baseball, comedy) or other information. It will also be understood that this information is much more than is required for programming a VCR, which simply requires an indication of recording time and recording channel.

Continuing with the description of FIG. 3, a "titles" group is provided which may include a field for group number, sequence number, show number, a title field and a field for description number and length. Finally the "descriptions" group may include a group number, sequence number, description number and description.

Figure 4:
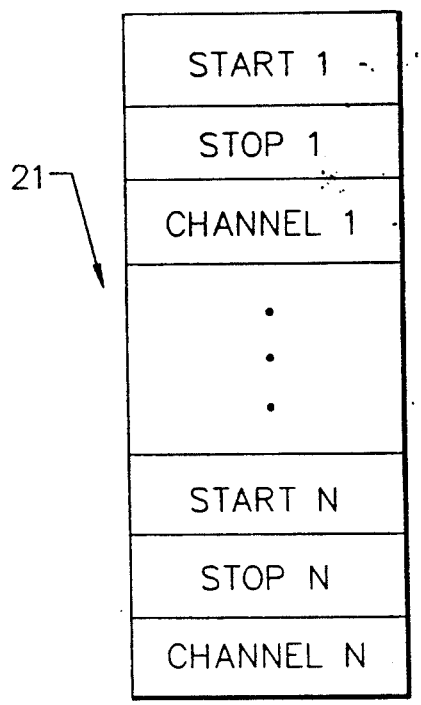
FIG. 4 is a schematic diagram of the event timer information which may be stored in the embodiment of FIGS. 1 or 2.

Referring now to FIG. 4, a description of the event timer information contained in VCR event timer 21 for controlling the VCR will now be described. As already described, event timer information is limited to a "time" and "channel" for each event. In particular, as shown in FIG. 4, three fields may be included for each event to be recorded. These three fields are a "start" field, "stop" field, and "channel" field. This sequence of start, stop and channel is repeated for all events which are to be recorded. It will be understood by those having skill in the art that "start" information may be provided by a conventional calendar date and time of day, or a time from the beginning of the year or other known technique for identifying a time. Similarly, "stop" information may be provided by a stop time in one of the formats discussed above for start time, or by simply providing a program duration from the start time, e.g. thirty minutes. "Channel" may be provided in a way which is compatible with the TV tuner which feeds the VCR or which is built into the VCR.

Figure 5:
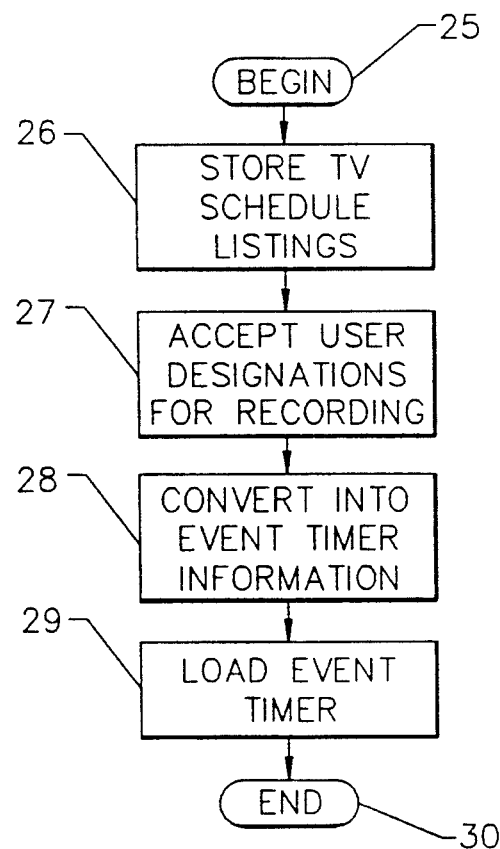
FIG. 5 illustrates the operations performed by the systems of FIGS. 1 or 2.

Referring to FIG. 5, the operation of FIGS. 1 or 2 will be described using the memory maps of FIGS. 3 and 4. In general, these operations may be implemented via a stored program running on controller 11. Referring now to FIG. 5, operation begins at Block 25. It will be understood by those having skill in the art that since controller 11 may be performing other functions, the operations beginning at Block 25 may be triggered upon receipt of an appropriate interrupt, for example when schedule information or user criteria are received, or when the user initiates a "record" function. At Block 26, TV schedule listings are stored, for example as described in the Reiter '578 patent and Young '121 patent, the Hallenbeck application or other known techniques. In particular, the TV schedule listings may be stored in TV schedule listings memory 12 as shown in FIG. 3.

Then, at Block 27, user designations for recording are accepted in a manner already described. At Block 28, the user designations for recording are converted into event timer information. Referring to FIGS. 3 and 4, conversion may be accomplished by converting the "day" and "time" field of the events group of FIG. 3 into an appropriate start time of FIG. 4. An appropriate stop time or duration for FIG. 4 may be computed from a similar field in the events group. Alternatively, an end time may be calculated by searching the TV program schedule information for the next occurring event on the selected channel. The channel information may be obtained by converting the service number field in the events group into an appropriate channel number.

It will be understood by those having skill in the art that the detailed technique for converting TV schedule information into event timer information will depend upon the particular configuration of the TV schedule information and event timer information. However, given a particular configuration of these two types of information, conversion may be readily accomplished by those having skill in the art. It will also be understood by those having skill in the art that data for each event may be converted upon selection by the user, or data for all selected events may be converted at the conclusion of the selection process.

After the data has been converted to event timer information at Block 28, the event timer 16 or 21 is loaded as appropriate. At Block 30 the process ends. It will be understood by those having skill in the art that once the process ends at Block 30 the TV schedule information listings are no longer necessary and they may be lost or discarded without losing the ability to record the designated programs at later times. Accordingly, an economical system is provided for recording television programs based on user selections from an on-line schedule, without requiring the maintenance of the listings in nonvolatile memory in order for recording to take place.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed:

1. A method for setting an event timer to control a recording device for recording television programs, comprising the steps of:

electronically storing television program schedule listings comprising a time, a channel and a title for a plurality of television programs;

accepting user designation of selected ones of the electronically stored television program schedule listings for recording;

automatically electronically converting the selected ones of said television program schedule listings into event timer information sequences for directly controlling a recording device to record television programs in response to the user designation of selected ones of the electronically stored television program schedule listings for recording, said event timer information sequences including a television program start time, a television program end time or duration and a television program channel for each of the user selected ones of the television program schedule listings; and loading the event timer information sequences into an event timer, such that the event timer information sequences in the event timer are used to control a recording device for recording television programs corresponding to the selected ones of the electronically stored television program schedule listings.

2. The method of claim 1 further comprising the step of controlling the recording device from the event timer information in the event timer.

3. The method of claim 2 wherein said controlling step comprises the step of transmitting commands to control the recording device based upon the event timer information in the event timer.

4. The method of claim 2 adapted for use with a recording device having a recording device event timer contained therein, and wherein said controlling step comprises the step of transferring the event timer information to the recording device event timer.

5. The method of claim 4 wherein said transferring step comprises the step of transmitting the event timer information to the recording device event timer via remote control.

6. The method of claim 1 wherein said loading step comprises the step of transmitting the event timer information to said event timer via remote control.

7. A method for setting an event timer to control a recording device for recording television programs, comprising the steps of:

electronically storing television program schedule listings comprising a time, a channel and a title for a plurality of television programs;

accepting user designation of selected ones of the electronically stored television program schedule listings for recording;

automatically electronically converting the selected ones of said television program schedule listings into event timer information sequences for directly controlling a recording device to record television programs in response to the user designation of selected ones of the electronically stored television program schedule listings for recording, said event timer information sequences including a television program start time, a television program end time or duration and a television program channel for each of the user selected ones of the television program schedule listings; and loading the event timer information sequences into an event timer;

wherein said loading step comprises the step of transferring the event timer information sequences to said event timer over a data bus, such that the event timer information sequences in the event timer are used to control a recording device for recording television programs corresponding to the selected ones of the electronically stored television program schedule listings.

8. A method for setting an event timer to control a recording device for recording television programs, comprising the steps of:

electronically storing television program schedule listings comprising a time, a channel and a title for a plurality of television programs;

accepting user designation of selected ones of the electronically stored television program schedule listings for recording;

automatically electronically converting the selected ones of said television program schedule listings into event timer information sequences for directly controlling a recording device to record television programs in response to the user designation of selected ones of the electronically stored television program schedule listings for recording, said event timer information sequences including a television program start time, a television program end time or duration and a television program channel for each of the user selected ones of the television program schedule listings;

loading the event timer information sequences into an event timer; and controlling a recording device from the event timer information sequences in the event timer;

wherein said controlling step comprises the step of transmitting commands to control the recording device based upon the event timer information sequences in the event timer;

wherein the recording device has a recording device having a recording device event timer contained therein, and wherein said controlling step comprises the step of transferring the event timer information sequences to the recording device event timer; and wherein said transferring step comprises the step of transferring the event timer information sequences to the recording device event timer over a data bus.

* * * * *